United States Patent [19]

Verrill et al.

[11] Patent Number: 4,620,578

[45] Date of Patent: Nov. 4, 1986

[54] TREE DELIMBER

[76] Inventors: Dale R. Verrill, Richville Rd., Oxford, Me. 04270; Samuel D. Sessions, Highland Ave., Norway, Me. 04268

[21] Appl. No.: 764,062

[22] Filed: Aug. 9, 1985

[51] Int. Cl.[4] .................. A01G 23/08; B27L 1/00
[52] U.S. Cl. .................................. 144/2 Z; 144/343
[58] Field of Search ............ 144/2 Z, 3 D, 208 E, 144/208 R, 343

[56] References Cited

U.S. PATENT DOCUMENTS 3,572,410 3/1971 McElderray .............. 144/2 Z

Primary Examiner—W. D. Bray
Attorney, Agent, or Firm—Harvey B. Jacobson

[57] ABSTRACT

A pair of slightly axially spaced and aligned upwardly opening generally semi-cylindrical lower jaws are provided together with an inverted downwardly opening generally semi-cylindrical upper jaw. One arc end portion of the upper jaw is mounted between one pair of corresponding arc ends of the lower jaws for swinging of the upper jaw between a closed position coacting with the lower jaws to define a generally horizontal cylindrical passage and a raised position with the other arc end of the upper jaw swung upwardly and the upper jaw opening in a generally horizontal direction with the upper jaw gravity biased toward the raised position. The aforementioned one arc end of the upper jaw includes abutment structure projecting into the area bound by the lower jaw when the upper jaw is in the raised position and engageable by a tree trunk lowered into the lower jaws to cam the upper jaw downwardly over the tree trunk. The other arc end of the upper jaw, when the latter is in the closed position, is snugly received between the other ends of the lower jaws to limit lateral deflection of the upper jaw other arc end and the jaws include opposite axial end tree trunk limb stripping edges.

8 Claims, 10 Drawing Figures

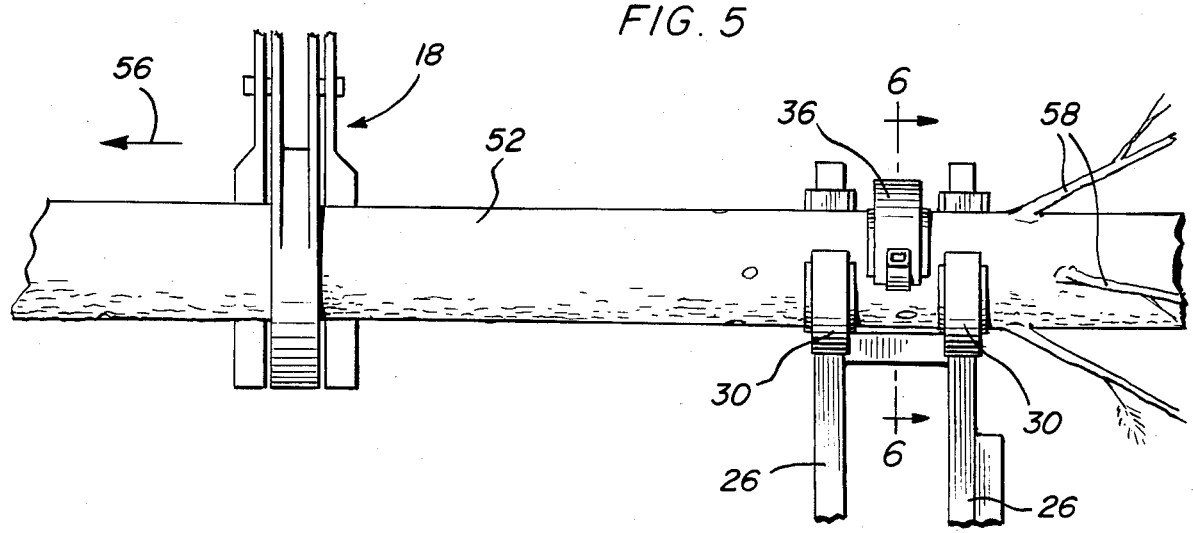
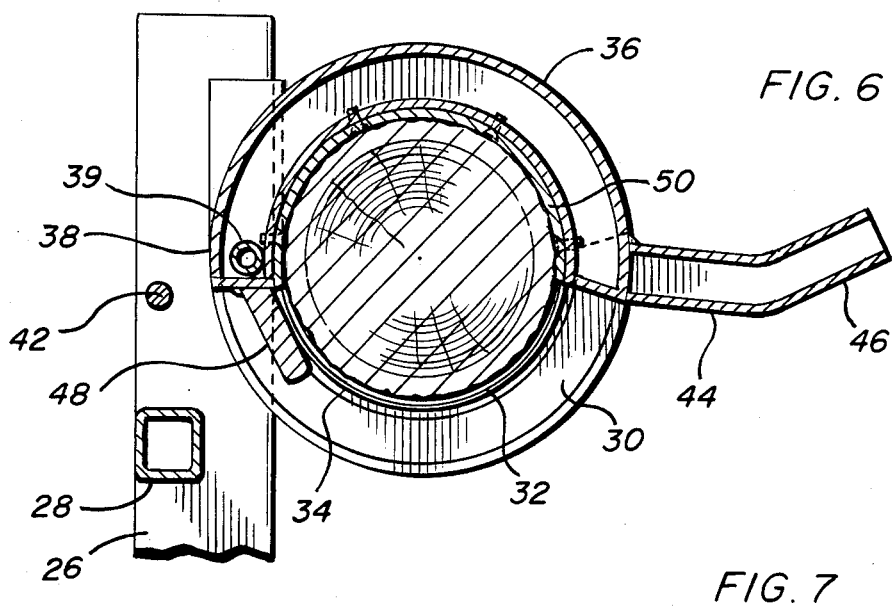
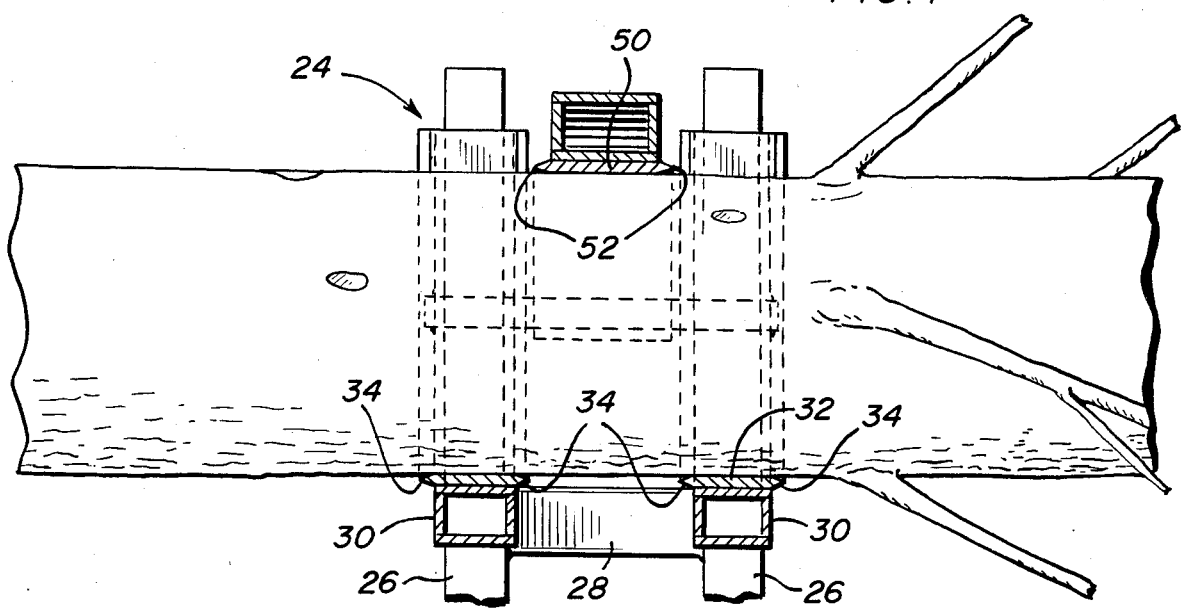

TREE DELIMBER

BACKGROUND OF THE INVENTION

1. Field of the Invention

This invention relates to a tree delimber to be used in conjunction with a grapple equipped crane and includes a pair of relatively swingable jaws together defining a generally cylindrical opening therebetween (when the jaws are closed) through which a limbed tree trunk may be reciprocated for removal of the limbs therefrom. The jaws may be opened to laterally receive a tree trunk to be delimbed therebetween and the closing and opening of the jaws is accomplished automatically by lateral advancement of a tree trunk between the open jaws and subsequent lateral displacement of the tree trunk in a direction away from the jaws.

2. Description of Related Art

Various different forms of tree delimbers heretofore have been provided such as those disclosed in U.S. Pat. Nos. 3,606,915, 3,881,532, 3,951,188, 4,335,766 and 4,440,202. However, these various tree delimbers require precise handling of the logs to be delimbed or mechanical opening and closing of one jaw of a pair of coacting delimbing jaws.

SUMMARY OF THE INVENTION

The delimber of the instant invention includes a pair of axially spaced upwardly opening semi-cylindrical jaws and an upper inverted semi-cylindrical jaw having one arc end thereof pivotally mounted between the corresponding arc ends of the lower jaws. The upper and lower jaws together define a generally cylindrical area bound by oppositely axially facing tree delimbing edges and a tree trunk to be delimbed is lengthwise reciprocated through the aforementioned area to effect the desired delimbing operation.

The pivoted upper jaw is upwardly swingable to a gravity stabilized over-center raised position upon upward displacement of a delimbed tree trunk from between the jaws and the pivoted end of the upper jaw includes an abutment arm which projects into the area encompassed by the lower jaws for engagement by a tree trunk to be delimbed downwardly displaced into the area bound by the lower jaws for closing the upper jaw over the upper portion of the tree trunk. Hence, the opening and closing of the movable jaw of the delimber is totally automatic.

The main object of this invention is to provide a tree delimber to be used in conjunction with a grapple equipped crane for efficiently and swiftly delimbing tree trunks.

Another object of this invention is to provide a tree delimber in accordance with the preceding object and mounted on a mobile trailer-type chassis whereby the delimber may be readily transported from one tree delimbing locality to another.

Still another important object of this invention is to provide a tree delimber of the trailer-type and which may be coupled to the rear of a mobile grapple equipped crane in a manner such that the grapple equipped crane may engage, pick-up and laterally displace the rear end of the trailer chassis from which the delimber is supported.

Another object of this invention is to provide a tree delimber including delimbing blade portions thereof which are readily removable and replaceable.

Still another object of this invention is to provide a tree delimber which may be incorporated on the chassis of a mobile trailer-type slasher.

A final object of this invention to be specifically enumerated herein is to provide a tree delimber in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is an enlarged fragmentary side elevational view illustrating the manner in which a tree trunk may be longitudinally advanced through the jaws of the delimber while the trunk is supported from a grapple equipped frame;

FIG. 6 is an enlarged fragmentary vertical sectional view taken substantially upon the plane indicated by the section line 6—6 of FIG. 5;

FIG. 7 is a fragmentary vertical sectional view taken substantially upon the plane indicated by the section line 7—7 of FIG. 6;

DESCRIPTION OF THE PREFERRED EMBODIMENT

Figure 1:
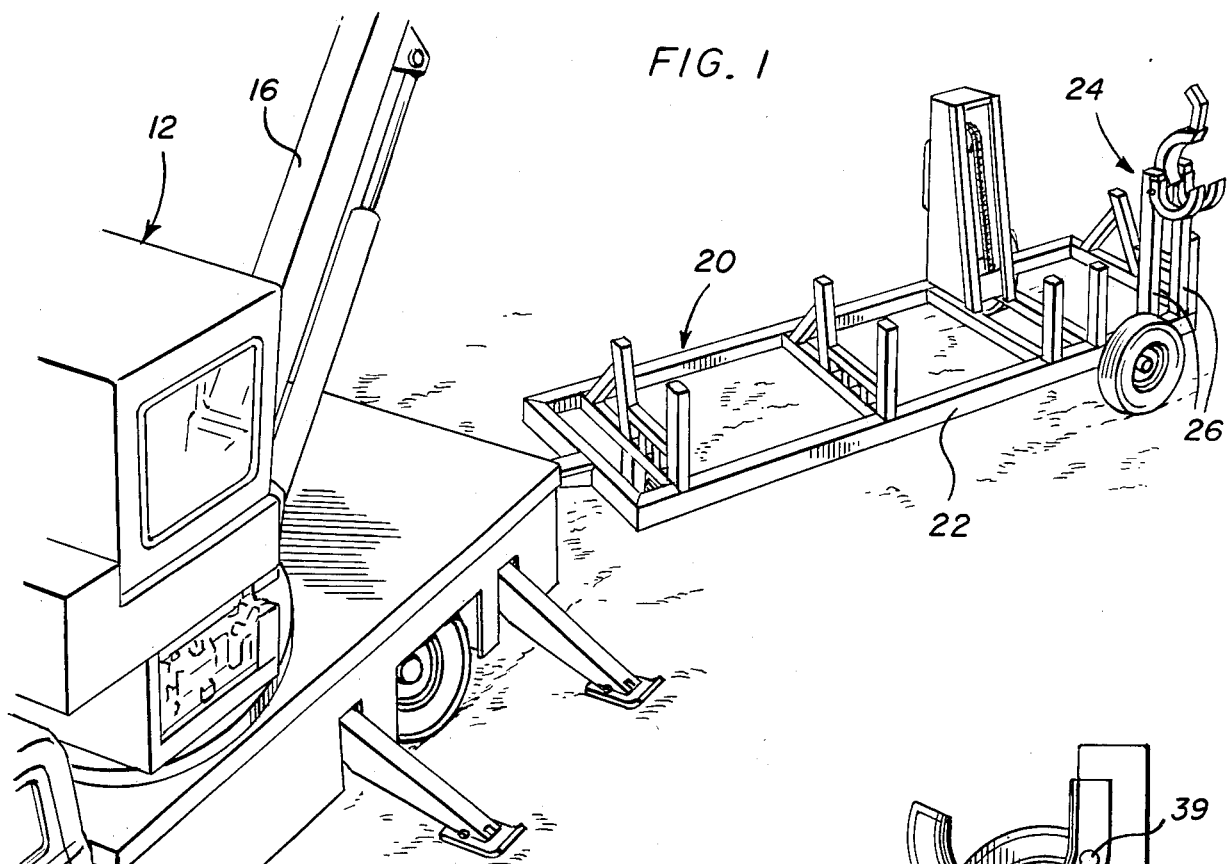
FIG. 1 is a perspective view of a trailer-type mobile slasher upon which the tree delimber of the instant invention has been mounted and with the trailer-type slasher coupled to the rear of a grapple equipped mobile frame.

Referring now more specifically to the drawings, the numeral 10 generally designates a conventional form of mobile crane comprising a crane assembly 12 mounted upon a heavy duty truck 14. The crane assembly 12 includes a boom 16 from which a conventional grapple assembly referred to in general by the reference numeral 18 is supported and a mobile slasher referred to in general by the reference numeral 20 and mounted on a wheeled trailer chassis is universally coupled to the rear of the truck 14 in any conventional manner.

The rear left-hand corner of the trailer frame 22 comprising a part of the slasher 20 mounts a tree delimber referred to in general by the reference numeral 24 therefrom. The tree delimber 24 includes a pair of uprights 26 supported from the frame 22 and interconnected adjacent their upper ends by transverse brace 28.

The tree delimber 24 supports a pair of upwardly opening and axially spaced generally semi-cylindrical lower jaws 30 therefrom. The lower jaws 30 project horizontally outwardly of the outer sides of the uprights 26 adjacent the upper ends of the latter and are equipped with movable and replaceable semi-cylindrical cutting blades 32 including bevelled opposite axial end edges 34, see FIG. 7.

Figure 10:
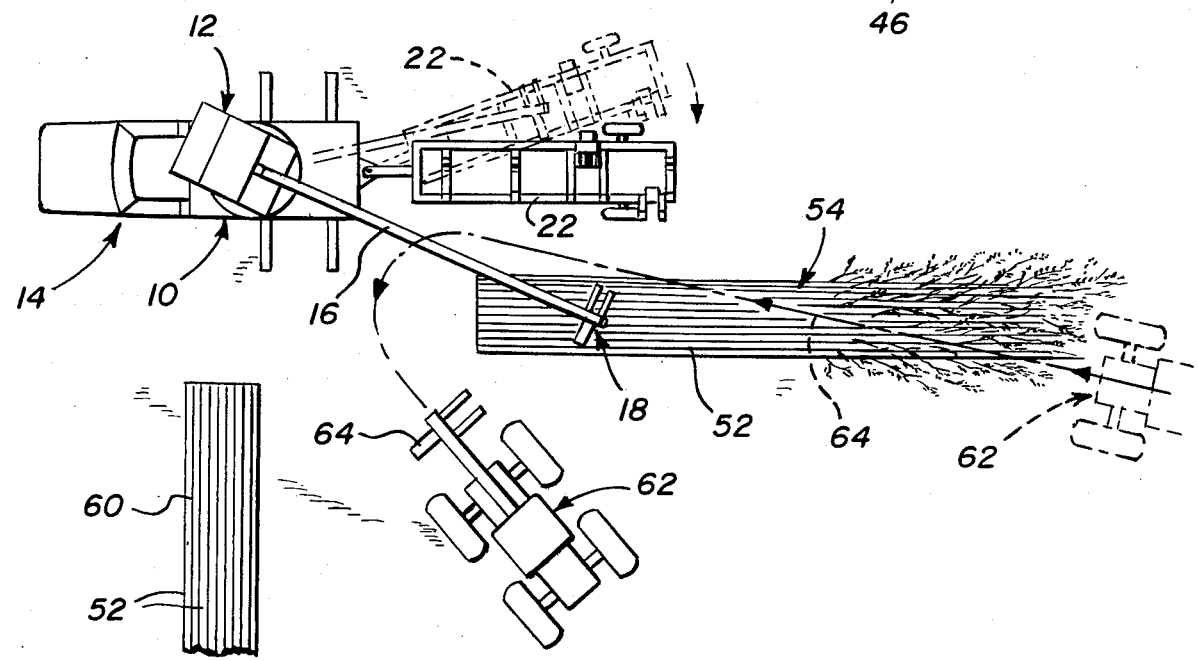
FIG. 10 is a top plan view of the overall assemblage illustrated in FIG. 1 and illustrating the manner in which the mobile trailer-type delimber equipped slasher may be laterally shifted to provide maneuvering room for a grapple equipped skidder to drag a supply of tree trunks to be delimbed into position adjacent the delimber and associated grapple equipped crane.
Figure 2:
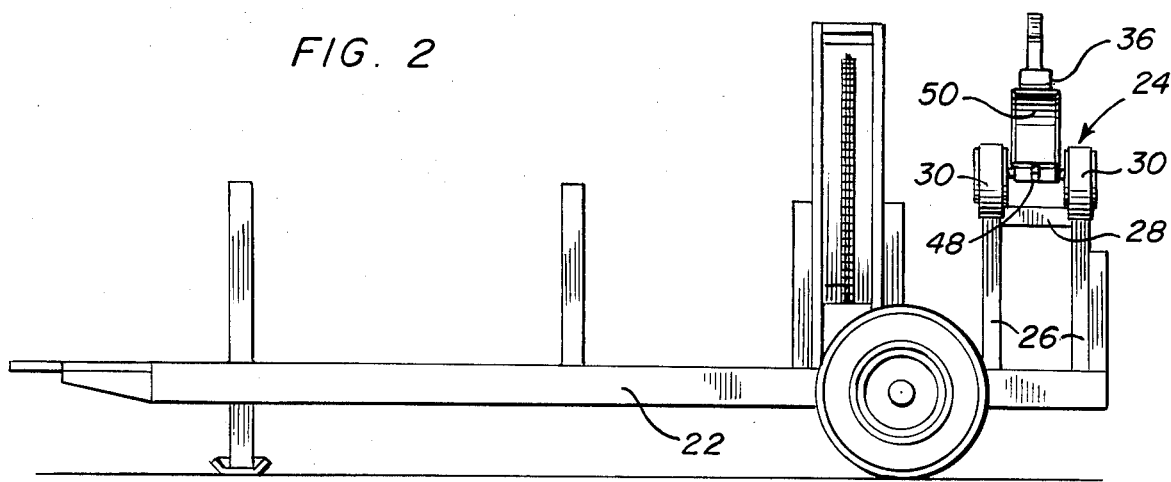
FIG. 2 is a side elevational view of the combined mobile slasher and tree delimber on somewhat of an enlarged scale.

An inverted downwardly opening and semi-cylindrical upper jaw 36 has one arc end 38 pivotally mounted between one corresponding pair of ends of the lower jaws 30 as at 39 and the upper jaw 36 is swingable between a raised inoperative position such as that illustrated in FIG. 10 of the drawings with the other arc end portion 40 thereof in substantial vertical registry with the arc end portion 38 and the upper jaw 36 opening across the upper portion of the semi-cylindrical area bound by the lower jaws 30 toward the outer side of the trailer frame 22. The upper jaw 36, when in the open position thereof illustrated in FIG. 10 abuts an abutment shaft 42 extending and connected between the upper ends of the uprights 26. When the upper jaw 36 is in the open position illustrated in FIG. 9, it is actually in an over-center position whereby it is retained in the open position against the shaft 42 by gravity.

The upper jaw 36 is, however, swingable to a closed position such as that illustrated in FIG. 8 whereby the arc end 40 of the upper jaw 36 is swung downwardly between and below the arc ends of the lower jaws 30 remote from the uprights 26.

Figure 8:
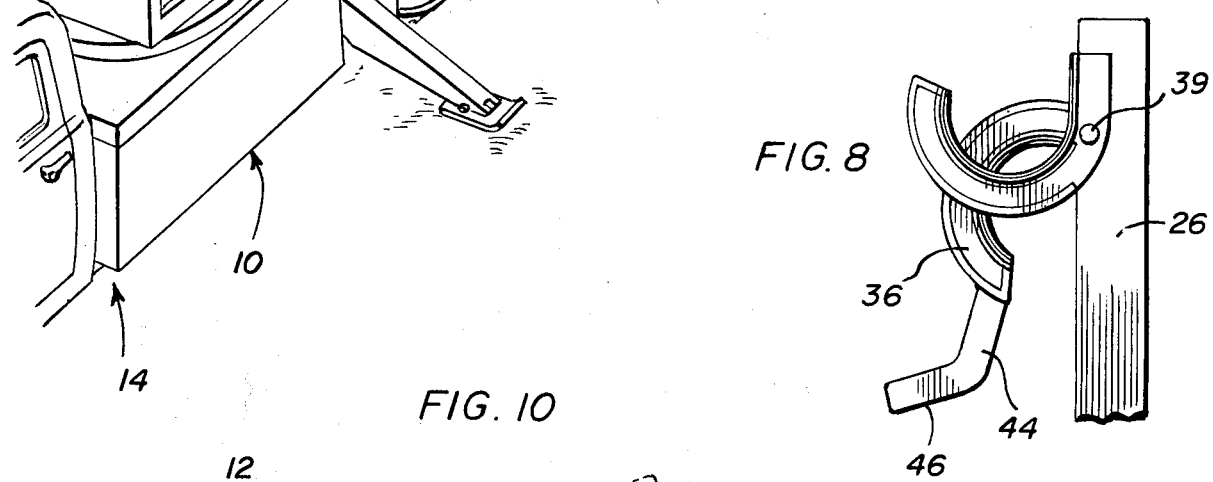
FIG. 8 is a rear elevational view of the delimber portion of the mobile slasher with the upper jaw thereof in a substantially fully closed position to which the upper jaw is gravity biased.
Figure 4:
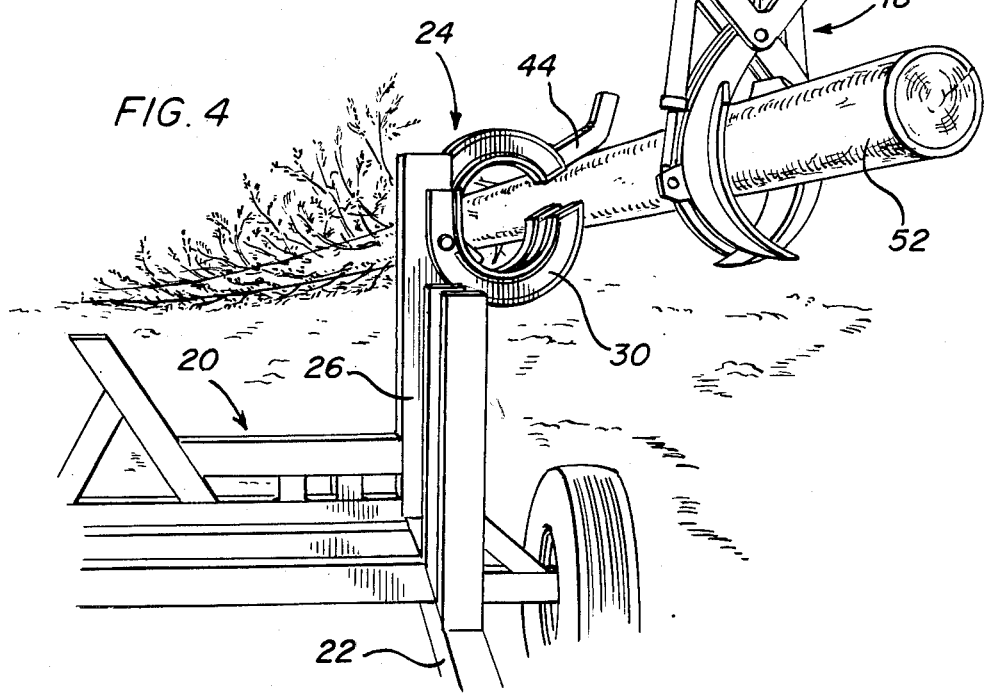
FIG. 4 is a fragmentary perspective view of the delimber portion of the mobile slasher with a log to be delimbed initially engaged with the opening arm of the pivoted upper jaw of the delimber.

It will also be noted from FIGS. 4, 6 and 8 of the drawings that the upper jaw 36 includes an outwardly projecting arm 44 supported from the arc end 38 and projecting outwardly therefrom along a path disposed generally radially of the axis of rotation of the upper jaw 36. The outer end of the arm 44 includes an angulated terminal end 46 which is slightly upwardly and outwardly inclined (see FIG. 6) when the upper jaw 36 opens substantially vertically downwardly. The upper jaw 36 coacts with the lower jaws 30 to define a substantially cylindrical opening between the jaws 36 and 30.

Figure 3:
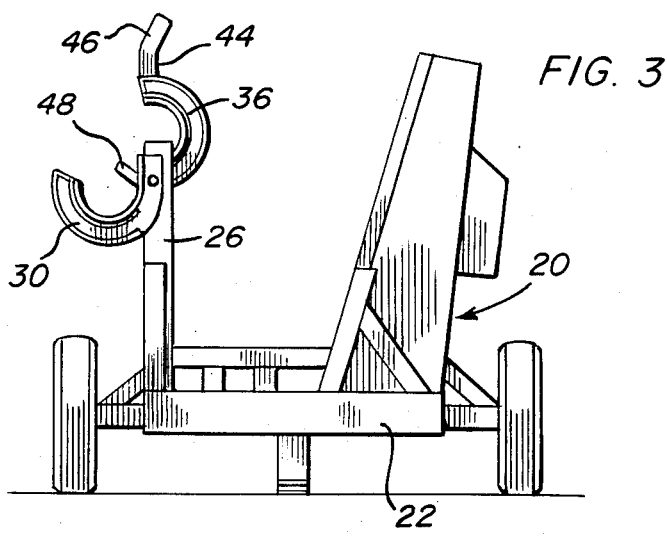
FIG. 3 is a rear elevational view of the assemblage illustrated in FIG. 2.
Figure 9:
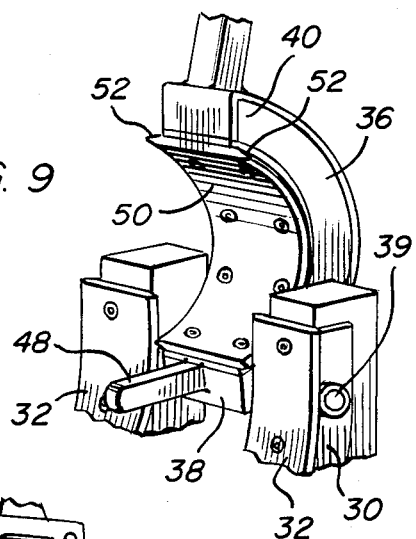
FIG. 9 is a fragmentary perspective view of the tree delimber structure with the upper jaw in a fully open position and illustrating the manner in which the tree delimbing blades of both the upper and lower jaws are removably supported therefrom.

With attention invited more specifically to FIGS. 3, 6 and 9 of the drawings, it may be seen that the arc end 38 of the upper jaw 36 includes an angulated abutment arm 48 supported therefrom and which projects into the area disposed immediately above the area bound by the lower jaws 30 when the upper jaw 36 is in the open position. Further, as may also be seen from FIG. 9, the upper jaw 36 includes a semi-cylindrical cutting blade 50 removably supported therefrom, the cutting blade 50 including bevelled opposite axial end cutting edges 52.

Upon the assumption that the upper jaw 36 is in the open position thereof illustrated in FIG. 3 of the drawings, the crane assembly 12 is actuated to pickup a single limbed tree trunk 52 from the pile 54 of tree trunk 52 having been positioned alongside the trailer frame 22, see FIG. 10. After the base portion of a single tree trunk 52 has been gripped by the grapple 18, the lower end of the tree trunk 52 is downwardly displaced into the area bound by the lower jaws 30 and abuts the abutment arm 48 during its final downward movement into cradled engagement with the lower jaws 30 for automatically swinging the upper jaw 36 to the closed position thereof illustrated in FIG. 6. Then, the crane pulls the tree trunk 52 in the direction of the arrow 56 in FIG. 5 to cause the limbs 58 to be stripped from the tree trunk 52 by the blades 32 and 52. After the tree trunk 52 has been shifted in the direction of the arrow 56 to position the upper diametrically reduced portion of the tree trunk 52 between the jaws 32 and 36, the grapple 18 is used to displace the tree trunk 56 in the opposite direction whereby any remaining limb portions are stripped from the tree trunk 52. Then, the grapple assembly 18 is lifted whereby the tree trunk 52 will upwardly displace the upper jaw 36 to the open position thereof illustrated in FIG. 3 and the delimbed tree trunk 52 may be placed upon the pile 60 of delimbed tree trunks 52 before the grapple is again used to pick up one of the limbed tree trunks 52 from the pile 54 thereof.

If for any reason vibration closes the upper jaw 36 inadvertently or the upper jaw 36 is purposely closed to the position thereof illustrated in FIG. 9, the terminal end 46 of the arm 44 may be engaged by a grapple supported tree trunk in order to initially upwardly displace the upper jaw 36 from the closed position thereof illustrated in FIG. 9 to the open position illustrated in FIG. 3. Thereafter, the tree trunks 52 from pile 54 may be repeatedly delimbed in the manner hereinabove set forth.

When the pile 54 is depleted, a skidder such as that referred to in general by the reference numeral 62 and equipped with a boom supported grapple 64 may be used to drag a new supply of limbed tree trunks 52 into the position of the pile 54 along the path 64. When the skidder 62 is used to drag a new pile of limbed tree trunks or logs to the position of the pile 54, the grapple assembly 18 may be used to engage, pickup and laterally displace the trailer frame 22 to the phantom line position thereof illustrated in FIG. 10 in order to provide sufficient maneuvering area for the skidder 62. Of course, after the new pile of limbed logs has been positioned where desired, the grapple assembly 18 of the crane assembly 12 may be used to again pick up the frame 22 from the position illustrated in phantom lines in FIG. 10 and again position the frame 22 in the solid line position of FIG. 10 before proceeding with the delimbing operation on the newly positioned pile of limbed logs or tree trunks. Further, the blades 32 and 50 may substantially non-removably be mounted on the jaws 30 and 36, by welding, if desired. Also, the delimber 24 may include a stationary mount or be mounted on a trailer chassis not including a slasher.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A tree delimber including a base, upwardly opening generally semi-cylindrical lower jaw means, support means mounting said lower jaw means in elevated position relative to and from said base, said lower jaw means including a pair of upwardly opening and axially spaced generally semicylindrical lower jaw members defining remote oppositely facing generally semi-cylindrical limb stripping edges, an inverted generally semi-cylindrical and downwardly opening upper jaw member, mounting means pivotally mounting one arc end portion of said upper jaw member between one pair of corresponding arc ends of said lower jaw members for swinging of said upper jaw member between a closed position with the other arc end portion of said upper jaw member gravity swung to a position spaced below the other pair of corresponding arc ends of said lower jaw members and an open position with said other arc end portion of said upper jaw member swung upwardly to a position with said upper jaw member disposed to one side of a vertical plane containing the center axis of said lower jaw members and opening toward the other side of said plane, and abutment means carried by said one arc end portion of said upper jaw member and projecting into the open area bound by said lower jaw members when said upper jaw member is in the raised open position and engageable by a log laterally downwardly displaced into the area bound by said lower jaw members to swing said upper jaw from said open position toward said closed position.

2. The delimber of claim 1 wherein said upper jaw member and support means include means establishing a limit position of movement of said upper jaw member toward said open position and to which said upper jaw member is gravity biased.

3. The tree delimber of claim 1 wherein said other arc end portion of said upper jaw member is snugly received between said other pair of corresponding arc ends of said lower jaw members when said upper jaw member is in the closed position to thereby enable the adjacent sides of said other pair of corresponding arc ends of said lower jaw members to constitute abutments engageable by said other arc end of said upper jaw member to limit lateral deflection thereof.

4. The tree delimber of claim 1 wherein said base comprises a wheeled trailer frame including front and rear ends, said jaw members being carried by the rear end of said frame, the front end of said frame being adapted for universally coupling to a mobile crane equipped with a grapple.

5. The tree delimber of claim 1 wherein each of said lower and upper jaw members includes a semi-cylindrical replaceable cutting blade whose opposite axial ends are sharpened.

6. The delimber of claim 1 wherein said upper jaw member and support means include means establishing a limit position of movement of said upper jaw member toward said open position and to which said upper jaw member is gravity biased, said other arc end portion of said upper jaw member being snugly received between said other pair of corresponding arc ends of said lower jaw members when said upper jaw member is in the lowered position to thereby enable the adjacent sides of said other pair of corresponding arc ends of said lower jaw members to constitute abutments engageable by said other arc end of said upper jaw member to limit lateral deflection thereof.

7. The tree delimber of claim 6 wherein said base comprises a wheeled trailer frame including front and rear ends, said jaw members being carried by the rear end of said frame, the front end of said frame being adapted for universally coupling to a mobile crane equipped with a grapple.

8. A tree delimber including a pair of slightly axially spaced and aligned upwardly opening generally semi-cylindrical lower jaws, an inverted downwardly opening generally semi-cylindrical upper jaw, mounting means pivotally mounting one arc end portion of said upper jaw between one pair of corresponding arc ends of said lower jaws for swinging of said upper jaw between a closed position coacting with said lower jaws to define a generally horizontal cylindrical passage and a raised position with the other arc end of said upper jaw swung upwardly and said upper jaw opening in a generally horizontal direction, said upper jaw, when in said raised position, being gravity biased theretoward against movement from said raised position to said closed position, said one arc end of said upper jaw including abutment means projecting into the area bound by said lower jaws when said upper jaw is in the raised position and engageable by a tree trunk lowered into said lower jaws to cam said upper jaw downwardly over said tree trunk, said other arc end of said upper jaw, when in said closed position, being snugly received between the other ends of said lower jaws to limit lateral deflection of said upper jaw other arc end, said jaws including opposite axial end tree trunk limb stripping edges.

* * * * *